United States Patent
Sakurada et al.

(10) Patent No.: US 10,937,319 B2
(45) Date of Patent: Mar. 2, 2021

(54) INFORMATION PROVISION SYSTEM, SERVER, AND MOBILE TERMINAL

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/668,085

(22) Filed: Oct. 30, 2019

(65) Prior Publication Data
US 2020/0175874 A1 Jun. 4, 2020

(30) Foreign Application Priority Data
Nov. 29, 2018 (JP) .............................. JP2018-224096

(51) Int. Cl.
*G08G 1/16* (2006.01)
*H04W 4/40* (2018.01)
(52) U.S. Cl.
CPC ............. *G08G 1/164* (2013.01); *G08G 1/166* (2013.01); *H04W 4/40* (2018.02)
(58) Field of Classification Search
CPC .......... G08G 1/164; G08G 1/166; H04W 4/40
USPC ......................................................... 340/905
See application file for complete search history.

(56) References Cited

U.S. PATENT DOCUMENTS

| 2001/0020902 A1* | 9/2001 | Tamura .............. G01C 21/3697 340/905 |
| 2013/0147955 A1* | 6/2013 | Oosugi .................. G08G 1/164 348/148 |
| 2014/0324247 A1* | 10/2014 | Jun ....................... G07C 5/0866 701/1 |
| 2015/0091712 A1* | 4/2015 | Poornachandran ....... G06F 1/00 340/407.1 |

(Continued)

FOREIGN PATENT DOCUMENTS

JP 2004-252550 A 9/2004

*Primary Examiner* — Kerri L McNally
(74) *Attorney, Agent, or Firm* — Oblon, McClelland, Maier & Neustadt, L.L.P.

(57) ABSTRACT

An information provision system has a vehicle-mounted device, server, and mobile terminal, which send and receive information to and from one another. The vehicle-mounted device has an imaging unit that images a vicinity of a vehicle, and a first transmitting unit that sends position information, vehicle condition information, and captured image data, to the server. The server has a dangerous spot information creating unit that creates dangerous spot information having a danger level and associated with position information, based on the vehicle condition information and captured image data, and a second transmitting unit that sends the dangerous spot information to the mobile terminal. The mobile terminal has a third transmitting unit that sends position information to the server, a receiving unit that receives the dangerous point information corresponding to the position information of the mobile terminal, and an output unit that outputs a warning based on the dangerous spot information.

12 Claims, 9 Drawing Sheets

23

| | 81 | 82 | 83 | 84 | 85 |
|---|---|---|---|---|---|
| | POSITION INFORMATION | DANGEROUS SCENE TYPE | HAZARDOUS VEHICLE CONDITION TYPE | DAY AND TIME | DANGER LEVEL |
| | 35° 40' N 139° 40' E | SUDDEN APPEARANCE OF PEDESTRIAN | SUDDEN BRAKING | 2018/4/1 14 : 25 | HIGH |
| | 35° 35' N 138° 20' E | SUDDEN APPEARANCE OF VEHICLE | ABRUPT STEERING | 2018/5/4 10 : 15 | HIGH |
| | 36° 23' N 136° 10' E | REDUCED VISIBILITY UNDER HIGH-LIGHT CONDITION | SUDDEN BRAKING | 2018/7/10 12 : 25 | HIGH |
| | 35° 28' N 135° 75' E | REDUCED VISIBILITY UNDER LOW-LIGHT CONDITION | ABRUPT STEERING | 2018/10/25 19 : 10 | HIGH |
| | 35° 30' N 134° 40' E | SUDDEN APPEARANCE OF VEHICLE | | 2018/9/7 9 : 55 | MEDIUM |
| | 35° 29' N 136° 25' E | | SUDDEN BRAKING | 2018/7/4 16 : 45 | MEDIUM |
| | 36° 60' N 139° 30' E | REDUCED VISIBILITY UNDER LOW-LIGHT CONDITION | | 2018/8/5 21 : 25 | MEDIUM |
| | ⋮ | ⋮ | ⋮ | ⋮ | ⋮ |

(56) References Cited

U.S. PATENT DOCUMENTS

| | | | |
|---|---|---|---|
| 2015/0178578 A1* | 6/2015 | Hampiholi | G08G 1/205 348/149 |
| 2015/0317044 A1* | 11/2015 | Abe | G02B 27/01 345/629 |
| 2017/0046952 A1* | 2/2017 | Yang | G06K 9/00791 |

* cited by examiner

| POSITION INFORMATION 81 | DANGEROUS SCENE TYPE 82 | HAZARDOUS VEHICLE CONDITION TYPE 83 | DAY AND TIME 84 | DANGER LEVEL 85 |
|---|---|---|---|---|
| 35° 40' N  139° 40' E | SUDDEN APPEARANCE OF PEDESTRIAN | SUDDEN BRAKING | 2018/4/1 14:25 | HIGH |
| 35° 35' N  138° 20' E | SUDDEN APPEARANCE OF VEHICLE | ABRUPT STEERING | 2018/5/4 10:15 | HIGH |
| 36° 23' N  136° 10' E | REDUCED VISIBILITY UNDER HIGH-LIGHT CONDITION | SUDDEN BRAKING | 2018/7/10 12:25 | HIGH |
| 35° 28' N  135° 75' E | REDUCED VISIBILITY UNDER LOW-LIGHT CONDITION | ABRUPT STEERING | 2018/10/25 19:10 | HIGH |
| 35° 30' N  134° 40' E | SUDDEN APPEARANCE OF VEHICLE | | 2018/9/7 9:55 | MEDIUM |
| 35° 29' N  136° 25' E | | SUDDEN BRAKING | 2018/7/4 16:45 | MEDIUM |
| 36° 60' N  139° 30' E | REDUCED VISIBILITY UNDER LOW-LIGHT CONDITION | | 2018/8/5 21:25 | MEDIUM |
| ... | ... | ... | ... | ... |

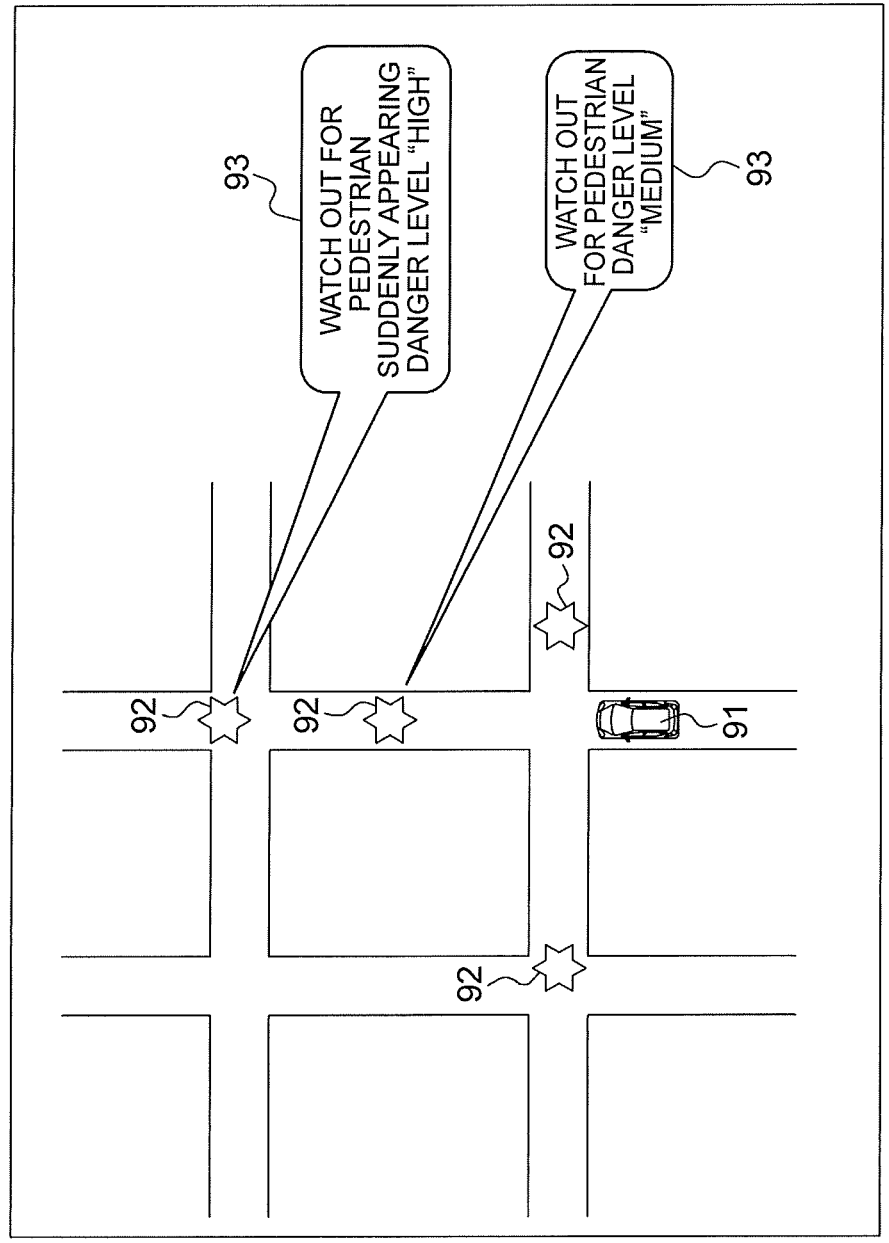

INFORMATION PROVISION SYSTEM, SERVER, AND MOBILE TERMINAL

INCORPORATION BY REFERENCE

The disclosure of Japanese Patent Application No. 2018-224096 filed on Nov. 29, 2018 including the specification, drawings and abstract is incorporated herein by reference in its entirety.

BACKGROUND

1. Technical Field

The disclosure relates to an information provision system, a server, and a mobile terminal.

2. Description of Related Art

Methods for avoiding the danger of various accidents by presenting a warning to a driver, during traveling of a vehicle, have been proposed. For example, a driving assistance system disclosed in Japanese Unexamined Patent Application Publication No. 2004-252550 (JP 2004-252550 A) specifies a dangerous scene through image processing, in a captured image of the front of the vehicle, and informs the driver of the dangerous scene.

SUMMARY

A technology of predicting danger during movement, such as traveling of the vehicle, at an earlier opportunity, with higher accuracy, has been desired.

The disclosure provides an information provision system, etc. which improves the promptness and accuracy of danger prediction during movement.

An information provision system according to a first aspect of the disclosure has a vehicle-mounted device, a server, and a mobile terminal, which send and receive information to and from one another. The vehicle-mounted device has an imaging unit that captures an image of a vicinity of a vehicle, and a first transmitting unit that sends position information, vehicle condition information, and captured image data, to the server. The server has a dangerous spot information creating unit that creates dangerous spot information having a danger level and associated with the position information, based on the vehicle condition information and the captured image data, and a second transmitting unit that sends the dangerous spot information to the mobile terminal. The mobile terminal has a third transmitting unit that sends position information of the mobile terminal to the server, a receiving unit that receives the dangerous spot information corresponding to the position information of the mobile terminal, and an output unit that outputs a warning based on the dangerous spot information.

A server according to a second aspect of the disclosure includes: a receiving unit that receives position information, vehicle condition information, and captured image data of a vicinity of a vehicle, from a vehicle-mounted device, and receives position information of a mobile terminal from the mobile terminal, a dangerous spot information creating unit that creates dangerous spot information having a danger level and associated with the position information, based on the vehicle condition information and the captured image data, and a transmitting unit that sends the dangerous spot information corresponding to the position information of the mobile terminal received from the mobile terminal, to the mobile terminal, such that a warning based on the dangerous spot information is generated at the mobile terminal.

A mobile terminal according to a third aspect of the disclosure includes: a transmitting unit that sends position information of the mobile terminal to a server that creates dangerous spot information having a danger level, based on position information, vehicle condition information, and captured image data obtained from a vehicle-mounted device, a receiving unit that receives the dangerous spot information corresponding to the position information of the mobile terminal, from the server and an output unit that outputs a warning based on the dangerous spot information.

The information provision system, etc. of this disclosure can improve the promptness and accuracy of danger prediction during movement.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 8 is a view showing an example of a dangerous spot information database (DB); and FIG. 9 is a view showing an output example of dangerous spot information.

DETAILED DESCRIPTION OF EMBODIMENTS

One embodiment of the disclosure will be described with reference to the drawings.

Figure 1:
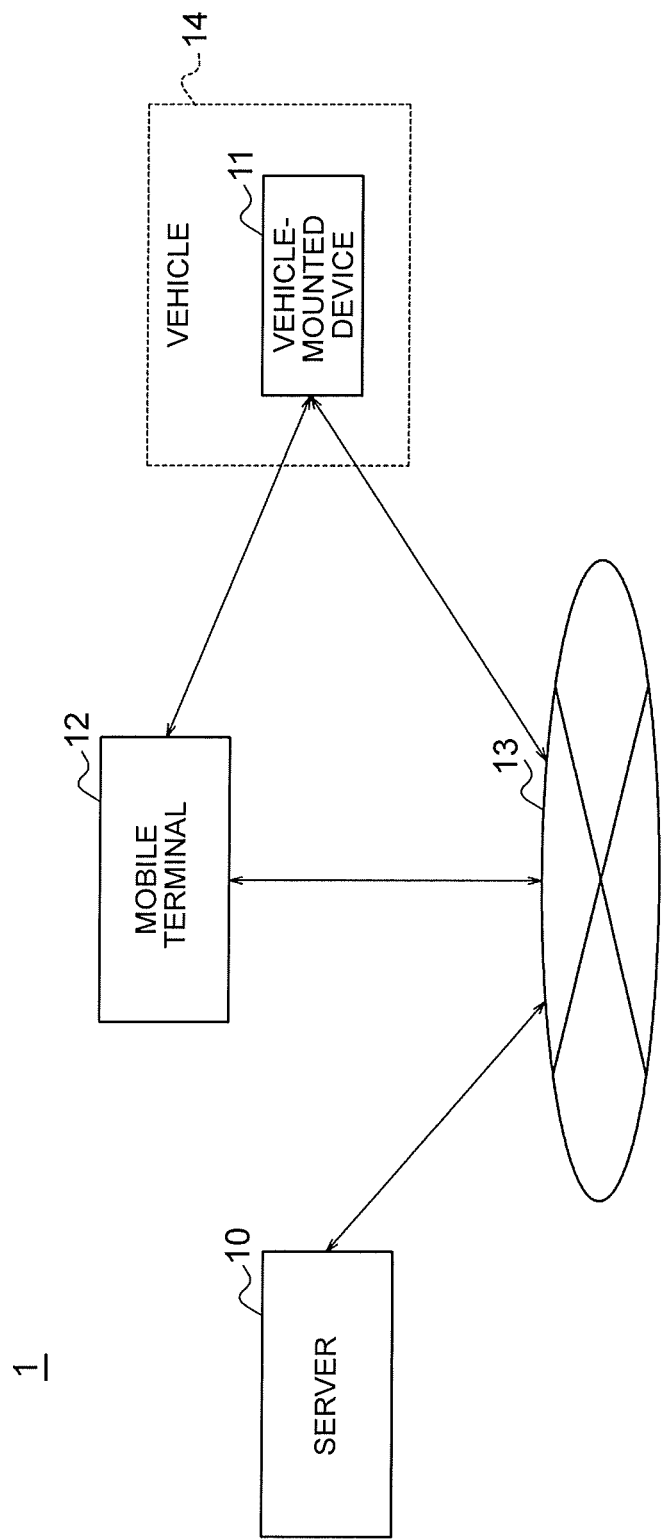
FIG. 1 is a view showing the configuration of an information provision system.

FIG. 1 shows the configuration of an information provision system 1 according to one embodiment. The information provision system 1 has a server 10, a mobile terminal 12, and a vehicle-mounted device 11 installed on a vehicle 14. The vehicle 14 is an automobile, for example, but it is not limited to this and may be any vehicle which the user can get in. The vehicle-mounted device 11 has an imaging function of capturing an image. The server 10, vehicle-mounted device 11 and mobile terminal 12 are connected by wire or wirelessly, such that data can be transmitted between them via a network 13. The information provision system 1 may have a plurality of vehicle-mounted devices 11 respectively installed on a plurality of vehicles 14. With this configuration, the server 10, vehicle-mounted device 11, and mobile terminal 12 send and receive various kinds of information to and from one another.

The information provision system 1 specifies a dangerous spot having a high probability of occurrence of a dangerous event during vehicle traveling, based on a captured image of the dangerous event and vehicle conditions at the time of the event, and provides the user with dangerous spot information. For example, the vehicle-mounted device 11 captures an image or images of the vicinity of the vehicle, and sends position information, vehicle condition information, and captured image data to the server 10. Then, the server 10 specifies a dangerous spot having a certain danger level, based on the vehicle condition information and the captured image data. Then, the server 10 sends the dangerous spot information corresponding to the position information of the mobile terminal 12, to the mobile terminal 12. Then, the mobile terminal 12 receives the dangerous spot information, and outputs a warning. Since the information provision system 1 determines the danger level, based on the dangerous scene actually imaged, and characteristic vehicle conditions of the vehicle 14 at the time of appearance of the scene, the system 1 can specify the dangerous spot having a high probability of occurrence of danger with high accuracy, and can provide the user with dangerous spot information with higher reliability.

Figure 2:
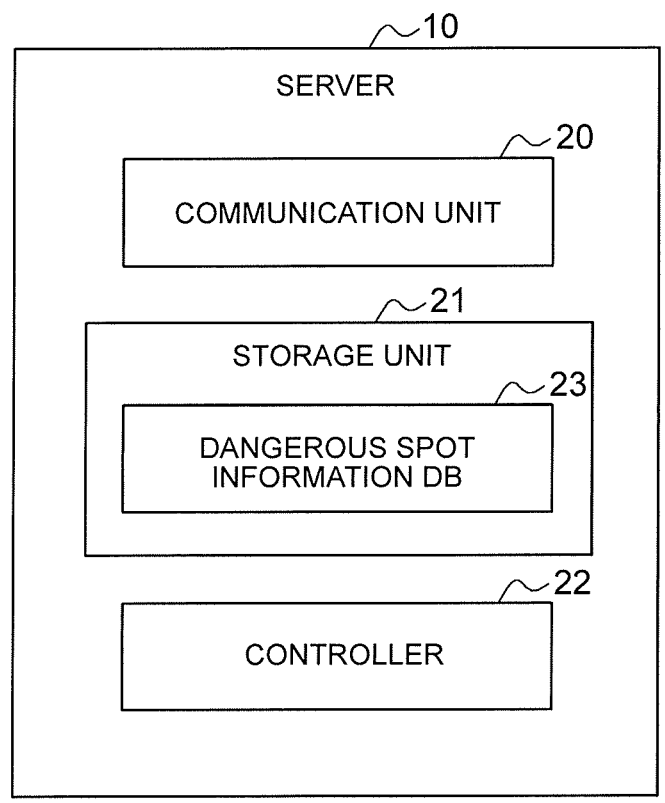
FIG. 2 is a view showing the configuration of a server.

FIG. 2 shows the configuration of the server 10. The server 10 has a communication unit 20, storage unit 21, and controller 22. The server 10 may be one computer, or consists of two or more computers that can communicate with each other.

The communication unit 20 includes one or more communication modules connected to the network 13. For example, the communication unit 20 may include a communication module that conforms to wired local area network (LAN) standards. In this embodiment, the server 10 is connected to the network 13 via the communication unit 20.

The storage unit 21 includes one or more memories. Each memory included in the storage unit 21 functions as a main storage device, auxiliary storage device, or cache memory. The storage unit 21 stores any information used for operation of the server 10, control and processing programs, and database. The storage unit 21 also stores a dangerous spot information database (DB) 23 that associates each dangerous spot with a danger level. The dangerous spot information DB 23 will be described in detail later.

The controller 22 has one or more processors. Each processor is a general-purpose processor, or a dedicated processor specialized for particular processing, but is not limited to these. The controller 22 controls operation of the server 10, according to the control and processing programs stored in the storage unit 21. The controller 22 also has a time measuring function for obtaining the current time.

Figure 3:
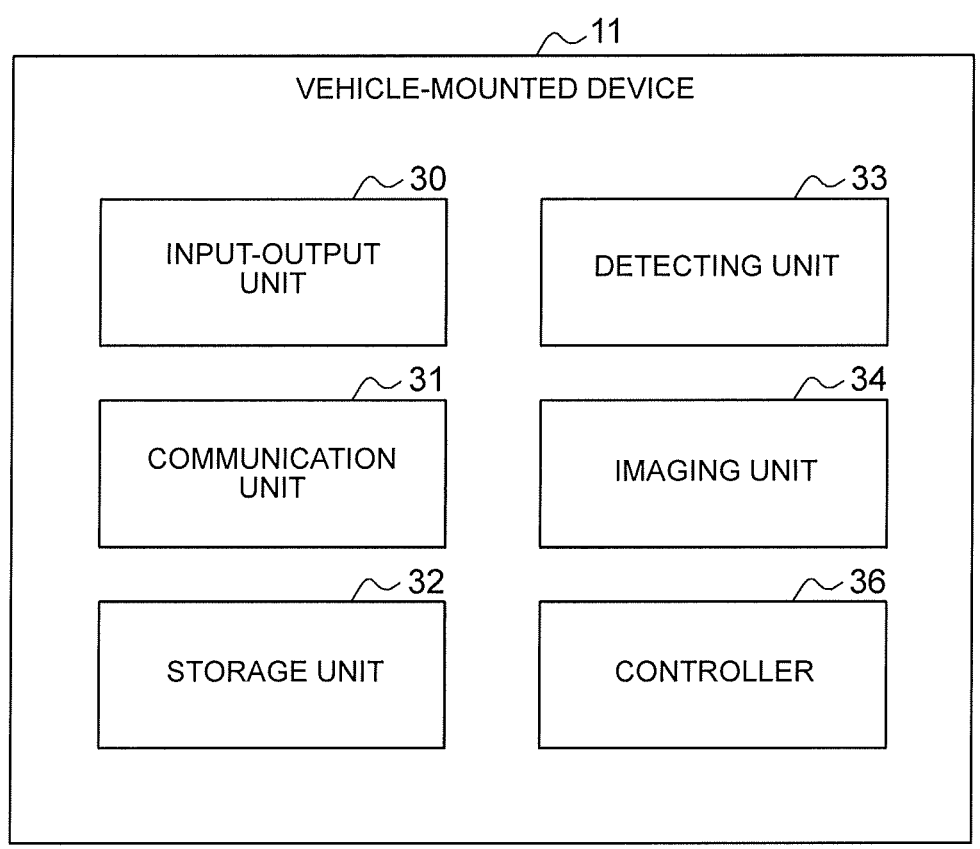
FIG. 3 is a view showing the configuration of a vehicle-mounted device.

FIG. 3 shows the configuration of the vehicle-mounted device 11. The vehicle-mounted device 11 has a communication unit 31, storage unit 32, detecting unit 33, imaging unit 34, and controller 36. The vehicle-mounted device 11 may be a single device, or may consist of two or more devices.

The communication unit 31 has one or more communication modules. The communication modules include a module or modules conforming to mobile telecommunication standards, such as 4th Generation (4G) or 5th Generation (5G), for example. Also, the communication unit 31 may have a communication instrument, such as a data communication module (DCM). The vehicle-mounted device 11 is connected to the network 13 via the communication unit 31, and conducts data communications with the server 10. The communication modules also include a global positioning system (GPS) receiver module. The vehicle-mounted device 11 receives a GPS signal via the communication unit 31.

The storage unit 32 includes one or more memories. Each memory included in the storage unit 32 is, for example, a semiconductor memory, magnetic memory, or optical memory, but is not limited to these. Each memory functions as a main storage device, auxiliary storage device, or cache memory, for example. The storage unit 32 stores any information used for operation of the vehicle-mounted device 11. For example, the storage unit 32 may store control and processing programs, built-in software, and so forth.

The detecting unit 33 has various sensors that detect the vehicle speed, braking force, acceleration, steering angle, yaw rate, etc. The detecting unit 33 sends detection results of these sensors to the controller 36, at given intervals.

The imaging unit 34 implements the imaging function of the vehicle-mounted device 11. The imaging unit 34 has one or more cameras that capture images of a landscape and objects in front of the vehicle 14 in the traveling direction, for example. The imaging unit 34 may also have cameras that capture images in a lateral direction of the vehicle 14 and rearward of the vehicle 14. Each camera of the imaging unit 34 may be a monocular camera or a stereo camera. The imaging unit 34 captures images of the landscape and objects outside the own vehicle, to create captured image data, and sends the data to the controller 36.

The controller 36 has one or more processors. Each processor is a general-purpose processor, or a dedicated processor specialized for particular processing, but is not limited to these. For example, an electronic control unit (ECU) installed on the vehicle 14 may function as the controller 36. The controller 36 controls overall operation of the vehicle-mounted device 11. Also, the controller 36 has a time measuring function for obtaining the current time.

Figure 4:
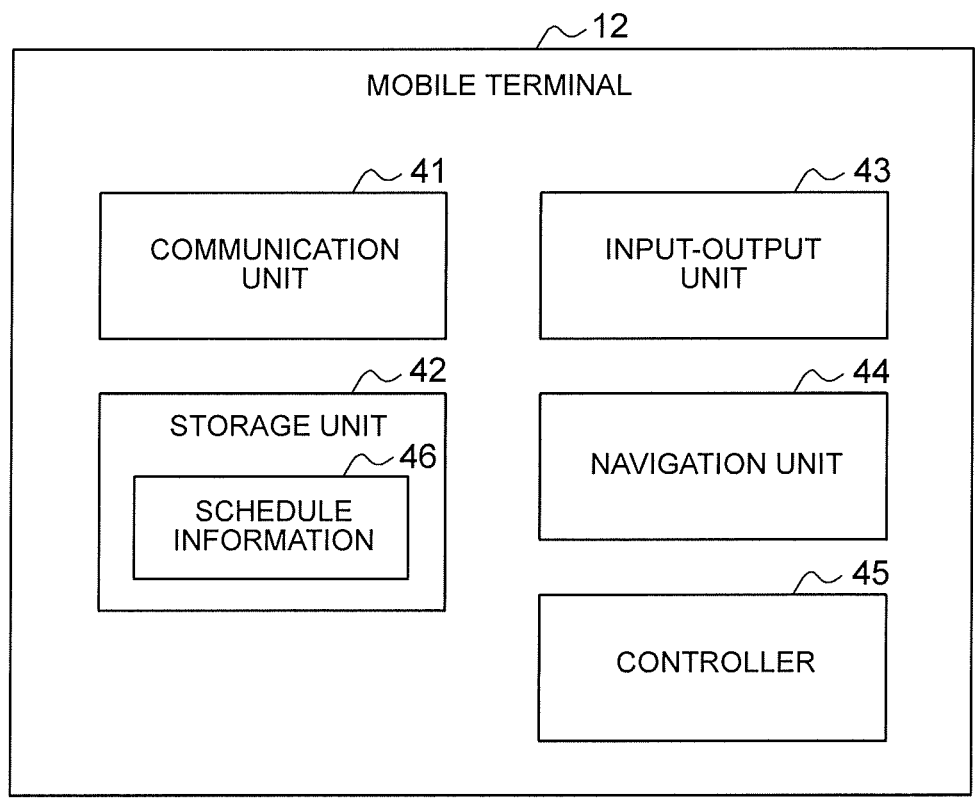
FIG. 4 is a view showing the configuration of a mobile terminal.

FIG. 4 shows the configuration of the mobile terminal 12. The mobile terminal 12 has a communication unit 41, storage unit 42, input-output unit 43, navigation unit 44, and controller 45. The mobile terminal 12 is, for example, a navigation device that provides route guidance, and is connected with or integrally formed with the vehicle-mounted device 11, to be fixed to the vehicle 14. Alternatively, the mobile terminal 12 may be a portable electronic device, such as a smartphone, or tablet, having a navigation function.

The communication unit 41 has one or more communication modules connected to the network 13. The communication modules may include a module or modules conforming to mobile telecommunication standards, such as 4G or 5G, for example. The mobile terminal 12 is connected to the network 13 via the communication unit 41. The communication modules include a GPS receiver module. The mobile terminal 12 receives a GPS signal indicating the current position, via the communication unit 41.

The storage unit 42 has one or more memories. Each memory is a semiconductor memory, for example, but is not limited to this. Each memory may function as a main storage device, auxiliary storage device, or cache memory, for example.

The storage unit 42 stores any information concerning control and processing operation of the mobile terminal 12.

The input-output unit 43 has an input interface that detects input information entered by the user, and sends the input information to the controller 45. The input interface is in the form of physical keys, capacitive keys, touch screen provided integrally with a panel display, or a microphone that receives voice input, for example, but is not limited to these, and may be any input interface. Also, the input-output unit 43 has an output interface that outputs information created by the controller 45 or read from the storage unit 42, to the user. The output interface is a panel display that outputs information in the form of image or video, or a speaker that outputs information in the form of voice, for example, but is not limited to these, and may be any output interface.

The navigation unit 44 has one or more processors that perform processing concerning route guidance. Alternatively, the navigation unit 44 may be realized by software, such as a program, etc. executed by the controller 45. The navigation unit 44 obtains map information from the storage unit 42, and obtains input information entered by the user, from the input-output unit 43. Also, the navigation unit 44 obtains a GPS signal from the communication unit 41, and detects the current position (e.g., latitude and longitude) based on the GPS signal. The navigation unit 44 creates information for use in route guidance, based on the user input information, current position, etc., and causes the input-output unit 43 to present the information to the user. Further, the navigation unit 44 obtains dangerous spot information from the server 10 via the communication unit 41, and causes the input-output unit 43 to present a warning to the user.

The controller 45 has one or more processors. Each processor is, for example, a general-purpose processor, or a dedicated processor specialized for particular processing, but is not limited to these. The controller 45 controls operation of the mobile terminal 12, according to control and processing programs stored in the storage unit 42, and executes various application programs.

Figure 5:
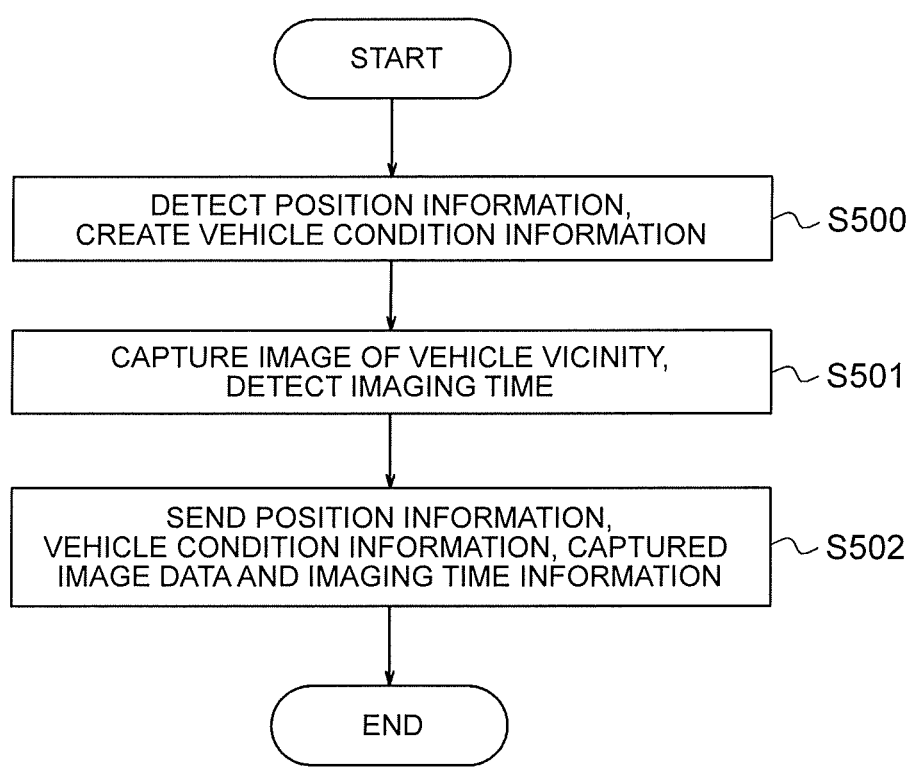
FIG. 5 is a flowchart illustrating the operation procedure of the vehicle-mounted device.
Figure 6:
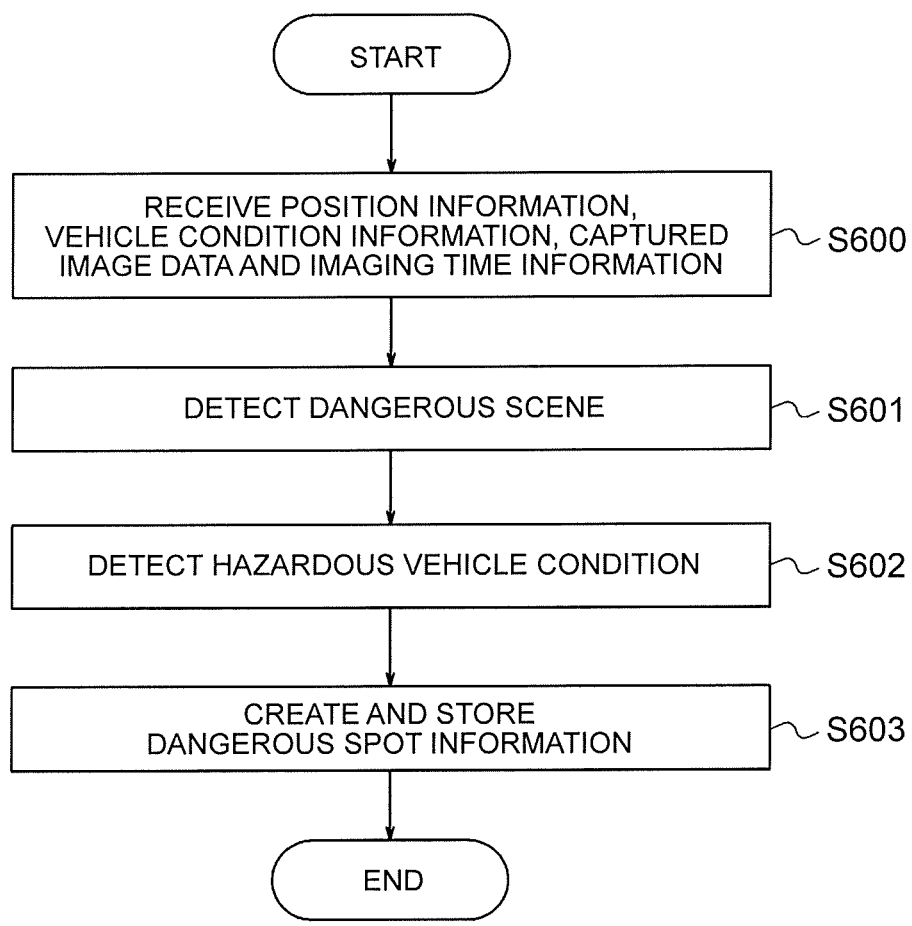
FIG. 6 is a flowchart illustrating the operation procedure of the server.
Figure 7:
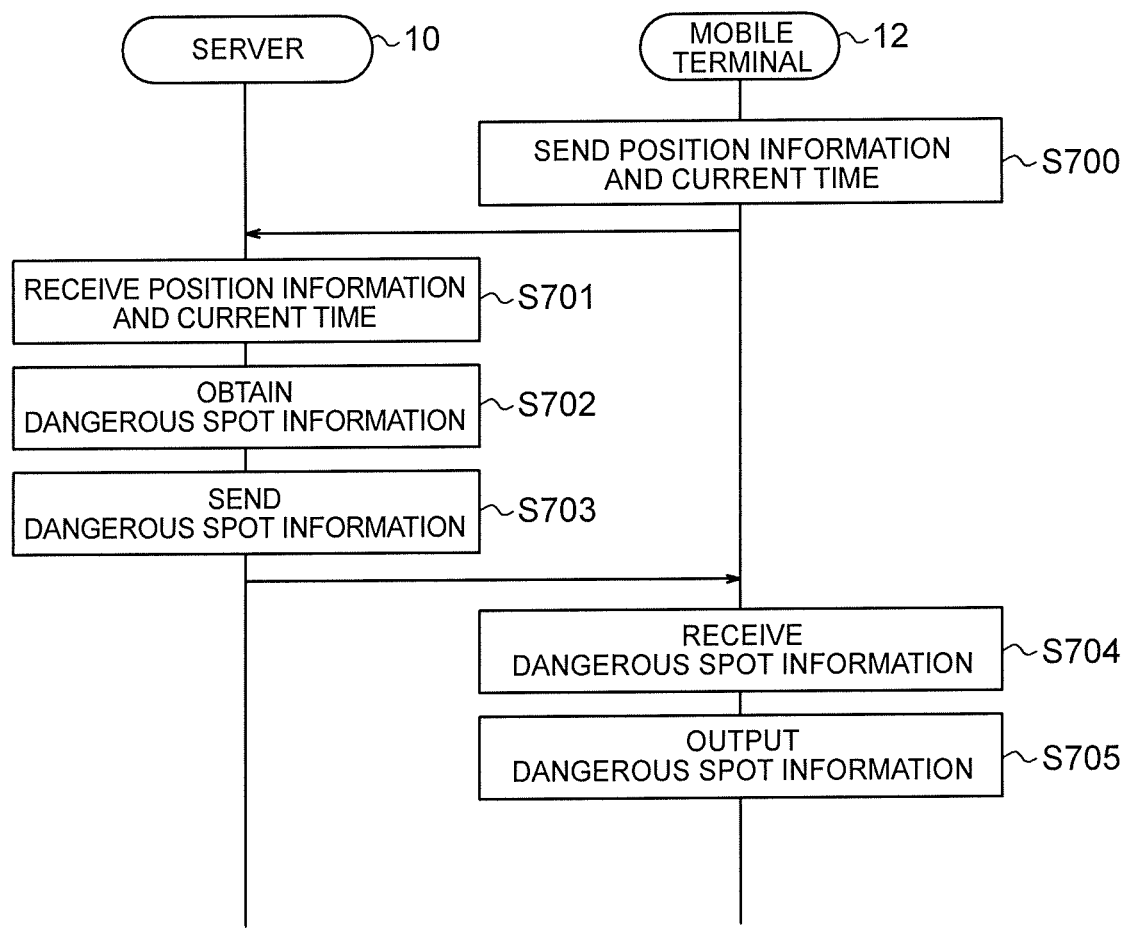
FIG. 7 is a sequence diagram indicating the operation procedure of the server and the mobile terminal.

Referring to FIG. 5 to FIG. 7, operation of the information provision system 1 will be described. FIG. 5, FIG. 6 and FIG. 7 are flowcharts illustrating operation of the information provision system 1 according to this embodiment. FIG. 5 shows an operation procedure of the vehicle-mounted device 11, and FIG. 6 shows an operation procedure of the server 10, while FIG. 7 shows operation procedures of the server 10 and the mobile terminal 12.

The operation procedure of the vehicle-mounted device 11 shown in FIG. 5 is executed periodically (e.g., at intervals of several milliseconds to several seconds), once the vehicle-mounted device 11 is activated, for example.

Initially, the vehicle-mounted device 11 detects position information, and creates vehicle condition information (step S500). In the vehicle-mounted device 11, the controller 36 obtains a GPS signal from the communication unit 31, and detects the current position of the vehicle 14 based on the GPS signal, for example. Also, the controller 36 obtains detection results of various sensors from the detecting unit 33, and creates vehicle condition information including the braking force, acceleration, steering angle, yaw rate, etc. The vehicle condition information is used for determining hazardous vehicle conditions, which are characteristic of a dangerous scene.

Then, the vehicle-mounted device 11 captures an image of the vicinity of the vehicle, and detects the time at which the image is captured (which will be called "imaging time") (step S501). For example, the controller 36 instructs the imaging unit 34 to capture an image, and the imaging unit 34 captures an image of a landscape and objects in front of the vehicle 14 in the traveling direction. Also, the controller 36 obtains the imaging time, using the time measuring function incorporate therein.

Then, the vehicle-mounted device 11 sends the position information, vehicle condition information, captured image data, and imaging time information, to the server 10 (step S502). For example, the controller 36 obtains captured image data from the imaging unit 34, and sends the captured image data, and the detected imaging time information, position information, and vehicle condition information, to the server 10, via the communication unit 31.

Steps S500, S501, and the order of operations in each step, are not limited to those of the example shown in FIG. 5. Also, instead of periodically executing steps S500 to S502, the vehicle-mounted device 11 may execute step S502, in response to detection of a predetermined vehicle condition (e.g., given braking force or steering angle) in step S500, as a trigger, for example.

The operation procedure of the server 10 shown in FIG. 6 is executed periodically (e.g., at intervals of several milliseconds to several seconds), for example.

Initially, the server 10 receives the position information, vehicle condition information, captured image data, and imaging time information, from the vehicle-mounted device 11 (step S600). In the server 10, the controller 22 receives the position information, vehicle condition information, captured image data, and imaging time information, from the vehicle-mounted device 11, via the communication unit 20. As each of the vehicle-mounted devices 11 of a plurality of vehicles 14 executes the procedure of FIG. 5 periodically, the server 10 collects the vehicle condition information, captured image data, and imaging time information, for each of spots at different positions on the map.

Then, the server 10 detects a dangerous scene, from the captured image data for each position (step S601). Examples of dangerous scenes include sudden appearance of another vehicle, such as a two-wheel vehicle, pedestrian, etc. from behind some object, and reduction of the visibility of another vehicle, stationary object, pedestrian, etc., under an excessively high-light condition (e.g., backlight, or excessive solar radiation) or under a low-light condition (e.g., twilight, night-time, cloudy weather, or rainy weather). For example, the controller 22 detects a dangerous scene, by performing image recognition processing, such as edge recognition, and image luminance distribution and pattern recognition, and distance detection processing, on captured image data. For example, the controller 22 detects movement of an object and its velocity, based on chronological changes in a plurality of consecutive pieces of captured image data. For example, the controller 22 determines sudden appearance of an object when it appears from behind another object while moving at a velocity equal to or higher than a given reference velocity. Also, the controller 22 determines reduction of the visibility, when another vehicle, stationary object, or pedestrian, for example, is detected at a distance smaller than a given reference distance, from a high-luminance background under an excessively high-light condition, or from a low-luminance background under a low-light condition. In this connection, any method, such as machine learning, may be used for the image recognition processing, etc. on the captured image data.

Then, the server 10 detects a hazardous vehicle condition from the vehicle condition information (step S602). Hazardous vehicle conditions are vehicle conditions characteristic or typical of dangerous scenes. The hazardous vehicle conditions include, for example, sudden braking, abrupt steering, and a combination of these conditions. The controller 22 detects braking force or a negative acceleration which represents sudden braking, or steering angle or yaw rate which represents abrupt steering. Reference values of the braking force, negative acceleration, steering angle, and yaw rate, which are used for detecting hazardous vehicle conditions, are set as desired based on experiments, etc. The hazardous vehicle conditions may also be detected by any given method, such as machine learning, other than the method as described above.

Then, the server 10 creates and stores dangerous spot information (step S603). For example, when a dangerous scene or a hazardous vehicle condition is detected at a certain position, the controller 22 determines this position as a dangerous spot. Then, the controller 22 stores position information (latitude and longitude) 81 for each dangerous spot, in association with the dangerous scene type 82, hazardous vehicle condition type 83, time 84, and danger level 85, in the dangerous spot information DB 23, as shown in FIG. 8. The dangerous scene type 82 has data, such as "sudden appearance of pedestrian", "sudden appearance of vehicle", "reduced visibility under high-light condition", and "reduced visibility under low-light condition", for example. The hazardous vehicle condition type 83 has data, such as "sudden braking", and "abrupt steering", for example. The time 84 is the imaging time of the captured image data in which a dangerous scene was detected, for example, namely, the time at which the dangerous scene may occur. The danger level 85 is determined as "Danger Level: HIGH" when both a dangerous scene and a hazardous vehicle condition were detected, and determined as "Danger Level: MEDIUM" when either one of the dangerous scene and hazardous vehicle condition was detected.

Here, the controller 22 that executes steps S601 to S603 corresponds to the "dangerous spot information creating unit".

The operation procedure of the server 10 and the mobile terminal 12 shown in FIG. 7 is executed periodically (e.g., at intervals of several milliseconds to several seconds), when the communication unit 41 or navigation unit 44 of the mobile terminal 12 is activated, for example.

The mobile terminal 12 sends position information and current time information to the server 10 (step S700). In the mobile terminal 12, the controller 45 regularly detects the current position based on a GPS signal, and obtains the current time through the time measuring function incorporated therein. Then, the controller 45 sends the position information and the current time information to the server 10 via the communication unit 41.

The server 10 receives the position information and the current time information from the mobile terminal 12 (step S701), and obtains dangerous spot information corresponding to the position information (step S702). In the server 10, the controller 22 receives the position information from the mobile terminal 12 via the communication unit 20. Then, the controller 22 reads a danger level at a dangerous spot corresponding to the position of the mobile terminal 12, referring to the dangerous spot information DB 23. The dangerous spot corresponding to the position of the mobile terminal 12 is located within a given distance range (e.g., 10 to 20 meters) from the position of the mobile terminal 12. The dangerous spot may also lie on an extension of a track of the mobile terminal 12 in the moving direction. The moving direction of the mobile terminal 12 is derived from displacement from the position of the mobile terminal 12 received in the past operation. Further, the controller 22 may use a condition that there is a dangerous scene time corresponding to the current time of the mobile terminal 12, as a condition for reading the danger level. In this manner, the danger level under a low-light condition at sunset (gloom) can be prevented from being erroneously read in a time zone of daytime, and the danger level under a high-light condition of backlight in summer time can be prevented from being erroneously read in winter time. Also, the controller 22 may selectively pick a dangerous spot or spots, depending on the danger level, or may read dangerous spot information of dangerous spots of all of the danger levels. As the danger level is higher, the accuracy in prediction of danger at the dangerous spot is higher. Thus, the accuracy in prediction is assured. The criteria of selection based on the danger level may be set in advance, or the user may enter selection into the mobile terminal 12, and the controller of the server 10 may select dangerous spot information, according to the selection.

Then, the server 10 sends the obtained dangerous spot information to the mobile terminal 12 (step S703). The controller 22 causes the communication unit 20 to send the dangerous spot information.

Then, the mobile terminal 12 receives the dangerous spot information (step S704), and outputs the information (step S705). For example, the controller 45 receives the dangerous spot information via the communication unit 41, and outputs the dangerous spot information in the form of an image, on a panel display of the input-output unit 43.

FIG. 9 shows an example of dangerous spot information generated by the mobile terminal 12. As shown in FIG. 9, the mobile terminal 12 displays the current position 91 of a vehicle, and dangerous spots 92 in the vicinity of the current position or predicted to be close to the vehicle, on a map information screen 90, for example. Further, the mobile terminal 12 may display or output by voice warnings 93 corresponding to the respective dangerous scene types, with respect to the dangerous spots 92.

The output (display or voice output) mode of the warnings corresponding to the respective dangerous scene types may be changed, according to an operation mode of the mobile terminal 12, for example. The operation mode is selected from a vehicle mode in the case where the mobile terminal 12 is used as a navigation device of the vehicle 14, and a pedestrian mode in the case where the mobile terminal 12 is carried by the user while he/she is walking. To select each mode, the user enters his/her selection on the input-output unit 43. For example, for a dangerous spot where sudden appearance of a pedestrian was detected, "WATCH OUT FOR PEDESTRIAN SUDDENLY APPEARING" is generated in the vehicle mode, whereas "DON'T RUN OUT INTO ROAD" is generated in the pedestrian mode. The warning 93 may also include a danger level for each dangerous spot 92. The mobile terminal 12 is used in this manner according to the user's need, assuring improved convenience for the user.

Thus, the information provision system 1 can provide more comprehensive dangerous spot information. Also, a warning can be presented in advance when the vehicle 14 or the user approaches a dangerous spot; thus, the warning can be presented at an earlier opportunity. Also, the danger level is determined based on the result of image processing and vehicle conditions for each dangerous spot; therefore, the accuracy in prediction of danger is assured.

While the disclosure has been described based on the drawings and the embodiment, it is to be understood that those skilled in the art can easily make various modifications and corrections based on the disclosure. Thus, it is to be noted that these modifications and corrections are included in the scope of the disclosure. For example, functions, etc. included in respective means or respective steps may be rearranged so as not to be logically inconsistent, and two or more means or steps may be combined into one, or a single means or step may be divided into two or more. In this embodiment, the controller 22 of the server 10 and the controller 36 of the vehicle-mounted device 11 read programs that describe procedures for performing the above operations, from the storage units 21, 32, respectively. Thus, the programs that cause the controller 22 of the server 10, controller 36 of the vehicle-mounted device 11, and controller 45 of the mobile terminal 12 to perform operations according to this embodiment are also included in the scope of the disclosure.

Further, the network 13 according to this embodiment may include an ad hoc network, local area network (LAN), metropolitan area network (MAN), cellular network, wireless personal area network (WPAN), public switched telephone network (PSTN), terrestrial wireless network, optical network, or other network, or a combination of two or more of these networks, other than that of the above embodiment. Constituent elements of the wireless network include, for example, access points (e.g., Wi-Fi access points), femtocells, etc. Further, wireless communications devices may be connected to a wireless network using Wi-Fi (registered trade name), cellular communications technology, or other wireless technologies and technology standards, other than Bluetooth (registered trade name).

Thus, various aspects of the disclosure may be implemented in many different embodiments, and these embodiments are all included in the scope of the disclosure.

What is claimed is:

1. An information provision system having a vehicle-mounted device, a server, and a mobile terminal, which send and receive information to and from one another, wherein:
   the vehicle-mounted device has an imaging unit that captures an image of a vicinity of a vehicle, and a first transmitting unit that sends position information, vehicle condition information, and captured image data, to the server;
   the server has a dangerous spot information creating unit that creates dangerous spot information having a danger level and associated with the position information, based on the vehicle condition information and the captured image data, and a second transmitting unit that sends the dangerous spot information to the mobile terminal; and
   the mobile terminal has a third transmitting unit that sends position information of the mobile terminal to the server, a receiving unit that receives the dangerous spot information corresponding to the position information of the mobile terminal, and an output unit that outputs a warning based on the dangerous spot information,
   wherein the first transmitting unit further sends an imaging time of the captured image data to the server,
   wherein the dangerous spot information creating unit includes the imaging time in the dangerous spot information,
   wherein the third transmitting unit further sends a current time to the server, and
   wherein the second transmitting unit sends the dangerous spot information corresponding to the current time.

2. The information provision system according to claim 1, wherein the second transmitting unit sends the dangerous spot information having a predetermined danger level.

3. The information provision system according to claim 1, wherein the second transmitting unit sends the dangerous spot information having a predetermined danger level.

4. The information provision system according to claim 1, wherein the output unit changes an output mode of the dangerous spot information according to an operation mode of the mobile terminal.

5. The information provision system according to claim 1, wherein the output unit changes an output mode of the dangerous spot information according to an operation mode of the mobile terminal.

6. The information provision system according to claim 2, wherein the output unit changes an output mode of the dangerous spot information according to an operation mode of the mobile terminal.

7. The information provision system according to claim 3, wherein the output unit changes an output mode of the dangerous spot information according to an operation mode of the mobile terminal.

8. A server comprising:
   a receiving unit that receives position information, vehicle condition information, and captured image data of a vicinity of a vehicle, from a vehicle-mounted device, and receives position information of a mobile terminal from the mobile terminal;
   a dangerous spot information creating unit that creates dangerous spot information having a danger level and associated with the position information, based on the vehicle condition information and the captured image data; and
   a transmitting unit that sends the dangerous spot information corresponding to the position information of the mobile terminal received from the mobile terminal, to the mobile terminal, such that a warning based on the dangerous spot information is generated at the mobile terminal,
   wherein the receiving unit further receives an imaging time of the captured image data from the vehicle-mounted device,
   wherein the dangerous spot information creating unit includes the imaging time in the dangerous spot information, and
   wherein the transmitting unit sends the dangerous spot information corresponding a current time received from the mobile terminal.

9. The server according to claim 8, wherein the transmitting unit sends the dangerous spot information having a predetermined danger level.

10. The server according to claim 8, wherein the transmitting unit sends the dangerous spot information having a predetermined danger level.

11. A mobile terminal comprising:
   a transmitting unit that sends position information of the mobile terminal to a server that creates dangerous spot information having a danger level, based on position information, vehicle condition information, and captured image data obtained from a vehicle-mounted device;
   a receiving unit that receives the dangerous spot information corresponding to the position information of the mobile terminal, from the server, the server sends the dangerous spot information corresponding a current time of the mobile terminal; and
   an output unit that outputs a warning based on the dangerous spot information,
   wherein the receiving unit further receives an imaging time of the captured image data from the vehicle-mounted device, and
   wherein the dangerous spot information includes the imaging time in the dangerous spot information.

12. The mobile terminal according to claim 11, wherein the output unit changes an output mode of the dangerous spot information, according to an operation mode.

* * * * *